(12) United States Patent
Fang et al.

(10) Patent No.: US 11,599,769 B2
(45) Date of Patent: Mar. 7, 2023

(54) QUESTION AND ANSWER MATCHING METHOD, SYSTEM AND STORAGE MEDIUM

(71) Applicant: ALIBABA GROUP HOLDING LIMITED, Grand Cayman (KY)

(72) Inventors: Hanyin Fang, Hangzhou (CN); Yang Liu, Hangzhou (CN); Guanjun Jiang, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 641 days.

(21) Appl. No.: 16/678,983

(22) Filed: Nov. 8, 2019

(65) Prior Publication Data

US 2020/0151542 A1 May 14, 2020

(30) Foreign Application Priority Data

Nov. 12, 2018 (CN) .......................... 201811340892.4

(51) Int. Cl.
*G06N 3/04* (2006.01)
*G06F 16/25* (2019.01)
*G06N 3/08* (2023.01)

(52) U.S. Cl.
CPC ............ *G06N 3/04* (2013.01); *G06F 16/252* (2019.01); *G06F 16/258* (2019.01); *G06N 3/08* (2013.01)

(58) Field of Classification Search
CPC .......... G06N 3/04; G06N 3/08; G06F 16/258; G06F 16/252
See application file for complete search history.

(56) References Cited

U.S. PATENT DOCUMENTS

| 5,519,608 A | 5/1996 | Kupiec |
| 7,318,053 B1 | 1/2008 | Cha et al. |
| 7,702,508 B2 | 4/2010 | Bennett |

(Continued)

FOREIGN PATENT DOCUMENTS

| CN | 106991161 A | * | 7/2017 | ......... G06F 16/3329 |
| CN | 108509411 A | * | 9/2018 | ............. G06F 17/16 |

(Continued)

OTHER PUBLICATIONS

PCT International Search Report and the Written Opinion dated Jan. 22, 2020, issued in related International Application No. PCT/US2019/060615 (11 pages).

(Continued)

*Primary Examiner* — Shean Tokuta

(57) ABSTRACT

The specification discloses a question answer matching method, system and computer storage medium. The method comprises: transforming the user query and one of one or more suggested answers corresponding to the user query by using a pre-trained word vector to obtain vector representations of the user query and the one of one or more suggested answers corresponding to the user query; performing a convolutional operation on the vector representations of the user query and the one of one or more suggested answers, respectively, to extract features; and mapping convolution results of the vector representations of the user query and the vector expression of the one of one or more suggested answers into a sample annotating space, to obtain a matching result of the user query.

19 Claims, 5 Drawing Sheets

(56) References Cited

U.S. PATENT DOCUMENTS

| | | | |
|---|---|---|---|
| 7,890,581 B2 | 2/2011 | Rao et al. | |
| 8,332,394 B2 | 12/2012 | Fan et al. | |
| 8,516,379 B2 | 8/2013 | D'Angelo et al. | |
| 9,047,567 B2 | 6/2015 | Barborak et al. | |
| 9,292,597 B2 | 3/2016 | Luo et al. | |
| 9,373,086 B1 | 6/2016 | Allen et al. | |
| 9,384,450 B1* | 7/2016 | Cordes | G06N 20/00 |
| 9,613,317 B2 | 4/2017 | Beamon et al. | |
| 10,255,273 B2* | 4/2019 | Chakraborty | G06N 3/0445 |
| 10,303,798 B2 | 5/2019 | Stubley et al. | |
| 10,572,653 B1* | 2/2020 | Semichev | G06Q 20/409 |
| 10,692,006 B1* | 6/2020 | Zhang | G06N 3/08 |
| 11,373,086 B2* | 6/2022 | Strope | H04L 51/02 |
| 2013/0029307 A1 | 1/2013 | Ni et al. | |
| 2014/0164303 A1 | 6/2014 | Bagchi et al. | |
| 2015/0179082 A1 | 6/2015 | Byron et al. | |
| 2016/0048772 A1* | 2/2016 | Bruno | G06N 5/04 706/11 |
| 2016/0247068 A1 | 8/2016 | Lin | |
| 2016/0350653 A1 | 12/2016 | Socher et al. | |
| 2017/0323010 A1 | 11/2017 | Byron et al. | |
| 2018/0012231 A1 | 1/2018 | Sapoznik et al. | |
| 2018/0329880 A1* | 11/2018 | Galitsky | G06F 40/44 |
| 2018/0341871 A1* | 11/2018 | Maitra | G06N 3/0427 |
| 2018/0357221 A1* | 12/2018 | Galitsky | G06N 20/10 |
| 2019/0079915 A1* | 3/2019 | Min | G06F 40/20 |
| 2019/0236085 A1* | 8/2019 | Galitsky | G06N 20/10 |
| 2019/0251184 A1* | 8/2019 | Shan | G06F 7/16 |
| 2019/0303768 A1* | 10/2019 | Zhang | G06N 5/04 |
| 2019/0371299 A1* | 12/2019 | Jiang | G10L 15/063 |
| 2020/0074238 A1* | 3/2020 | Umeno | G06V 10/764 |
| 2020/0090539 A1* | 3/2020 | He | G06N 3/08 |
| 2020/0097814 A1* | 3/2020 | Devesa | G06N 3/08 |
| 2020/0134263 A1* | 4/2020 | Oh | G06N 3/0454 |
| 2020/0151542 A1* | 5/2020 | Fang | G06N 3/04 |
| 2021/0012222 A1* | 1/2021 | Kim | G06V 20/49 |

FOREIGN PATENT DOCUMENTS

| | | | | |
|---|---|---|---|---|
| CN | 110532348 A | * | 12/2019 | G06F 16/319 |
| CN | 113886550 A | * | 1/2022 | |
| EP | 3166049 A1 | | 5/2017 | |
| EP | 3376400 A1 | * | 9/2018 | |
| WO | WO-2018001169 A1 | * | 1/2018 | G06F 16/00 |
| WO | WO-2019012908 A1 | * | 1/2019 | G06F 16/3329 |
| WO | WO-2019084867 A1 | * | 5/2019 | G06F 16/3329 |
| WO | WO-2020034642 A1 | * | 2/2020 | G06N 3/0427 |

OTHER PUBLICATIONS

Sheng Zhang et al., Chinese Medical Question Answer Matching Using End-to-End Character-Level Multi-Scale CNNs, Applied Sciences, vol. 7, 767, 2017, pp. 1-17.

* cited by examiner

QUESTION AND ANSWER MATCHING METHOD, SYSTEM AND STORAGE MEDIUM

CROSS REFERENCE TO RELATED APPLICATION

The present application is based on and claims priority to Chinese Patent Application No. 201811340892.4, filed on Nov. 12, 2018, which is incorporated herein by reference in its entirety.

TECHNICAL FIELD

The present invention relates to the field of information retrieval technologies, and in particular, to a question answer matching method, system and storage medium in a smart transaction scenario.

BACKGROUND

In a smart transaction scenario, the demand for question and answer is high. Namely, a user inputs a query (e.g., an input request string of the user) and expects to obtain a concise answer to meet the demand for obtaining information. In the process of solving this problem, one important intermediate step is how to determine whether a short answer (e.g., the form of a single sentence) matches the query of the user.

Existing conventional methods are mainly based on artificial rules and features, e.g., Named Entity Recognition (NER), Term Frequency-Inverse Document Frequency (e.g., TF-IDF), and template matching. These methods have the following drawbacks:

1) a lot of manual work is required to observe samples and then design rules and features;

2) inconsistent capabilities of expressing different features, and insufficient generalization capabilities for mass data; and 3) the overall effect of the model is limited by the accuracy of a model for feature extraction at an earlier stage, e.g., the NER model.

SUMMARY

To solve the above-described problems, this specification provides a question answer matching system and method, and a question answering processing device and medium.

According to a first aspect of one or more embodiments of this specification, a question answer matching method based on a convolutional neural network is provided. The method comprises transforming the user query and one of one or more suggested answers corresponding to the user query by using a pre-trained word vector to obtain vector representations of the user query and the one of one or more suggested answers corresponding to the user query; performing a convolutional operation on the vector representations of the user query and the one of one or more suggested answers, respectively, to extract features; and mapping convolution results of the vector representations of the user query and the vector expression of the one of one or more suggested answers into a sample annotating space, to obtain a matching result of the user query, wherein the convolutional operation on the vector expression of the user query does not share a configuration parameter with the convolutional operation on the vector expression of the one of one or more suggested answers, the configuration parameter including a weight parameter and/or a bias parameter.

In some embodiments, the question answer matching method further comprises: using a positive sample and a negative sample in a pre-constructed dataset as training data to train the convolutional neural network from end to end to obtain an answer matching the user query.

In some embodiments, the question answer matching method further comprises obtaining, from existing data, a positive sample based on a query and a best answer corresponding to the query, a negative sample based on the query and a randomly sampled answer not corresponding to the query, and another negative sample based on the query and an answer with literal similarities to the query, thereby to construct the pre-constructed dataset corresponding to the query and apply the pre-constructed dataset to the convolutional neural network.

In some embodiments, the question answer matching method further comprises: collecting query data from users and encyclopedia data as corpuses, the query data comprising a plurality of queries; and training the pre-trained word vector based on the corpuses.

In some embodiments, the query data is filtered based on a number of iterations of each of the plurality of queries when the query data is collected.

According to a second aspect of one or more embodiments of this specification, a question answer matching system for providing a matching answer to a user query based on a convolutional neural network is provided. The system comprises one or more processors and one or more non-transitory computer-readable storage media storing instructions executable by the one or more processors to cause the system to perform operations comprising transforming the user query and one of one or more suggested answers corresponding to the user query by using a pre-trained word vector to obtain vector representations of the user query and the one of one or more suggested answers corresponding to the user query; performing a convolutional operation on the vector representations of the user query and the one of one or more suggested answers, respectively, to extract features; and mapping convolution results of the vector representations of the user query and the vector expression of the one of one or more suggested answers into a sample annotating space, to obtain a matching result of the user query, wherein the convolutional operation on the vector expression of the user query does not share a configuration parameter with the convolutional operation on the vector expression of the one of one or more suggested answers.

According to a third aspect of one or more embodiments of this specification, a non-transitory computer-readable storage medium for providing a matching answer to a user query based on a convolutional neural network is provided. The storage medium is configured with instructions executable by one or more processors to cause the one or more processors to perform operations comprising: transforming the user query and one of one or more suggested answers corresponding to the user query by using a pre-trained word vector to obtain vector representations of the user query and the one of one or more suggested answers corresponding to the user query; performing a convolutional operation on the vector representations of the user query and the one of one or more suggested answers, respectively, to extract features; and mapping convolution results of the vector representations of the user query and the vector expression of the one of one or more suggested answers into a sample annotating space, to obtain a matching result of the user query, wherein the convolutional operation on the vector expression of the user query does not share a configuration parameter with the convolutional operation on the vector expression of the one of one or more suggested answers.

According to the specification, a set of word vectors with strong generalization capabilities can be pre-trained as basic features, and moreover, corresponding training datasets can be constructed to train a convolutional neural network for providing the a matching answer to a user query in a smart transaction scenario. Furthermore, an end to end (e.g., one model is used throughout the entire process from original data input to final output) matching model is obtained through training by using the expression capability of the convolutional neural network. As a result, for a query from a user, the question answer matching method and/or system of the specification can be used to provide an accurate matching answer to the user.

DETAILED DESCRIPTION

Embodiments will be described in detail, with examples shown in the accompanying drawings. When the description below involves the accompanying drawings, unless otherwise indicated, the same numeral in different accompanying drawings stands for the same element or similar elements. The implementation manners described in the following embodiments do not represent all the implementation manners consistent with the specification. Rather, they are examples of the apparatuses and methods described in detail in the attached claims and consistent with some aspects of one or more embodiments of the specification.

Figure 1:
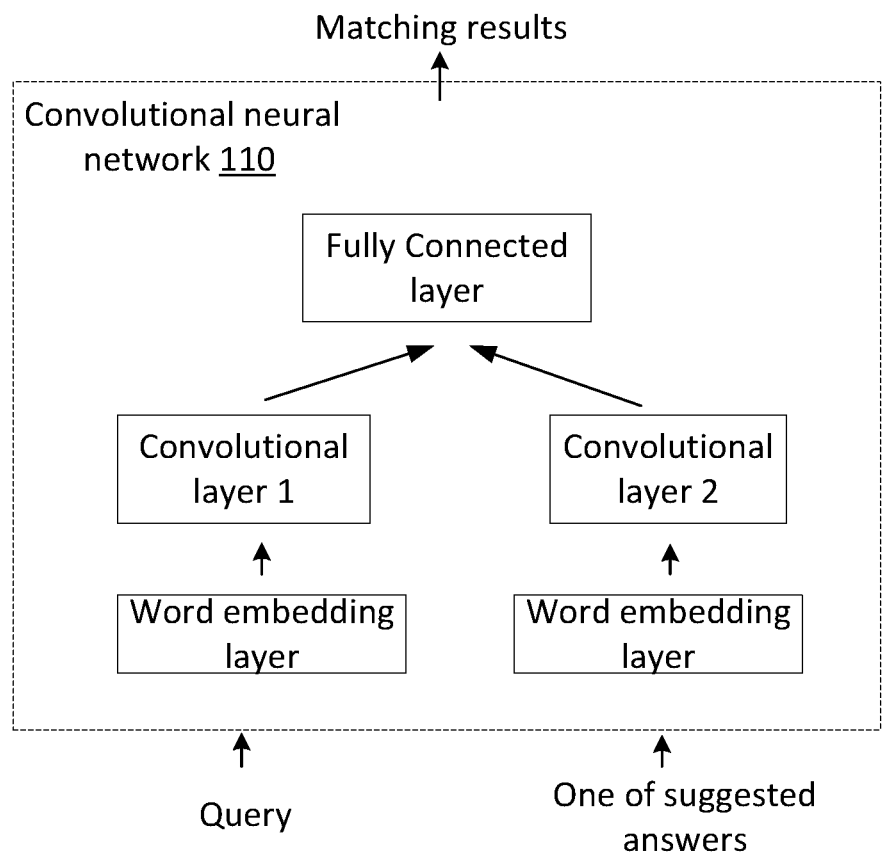
FIG. 1 is a schematic block diagram of a question answer matching system based on a convolutional neural network according to some embodiments of the specification.

FIG. 1 is a schematic block diagram of a question answer matching system based on a convolutional neural network according to some embodiments of the specification.

Figure 2:
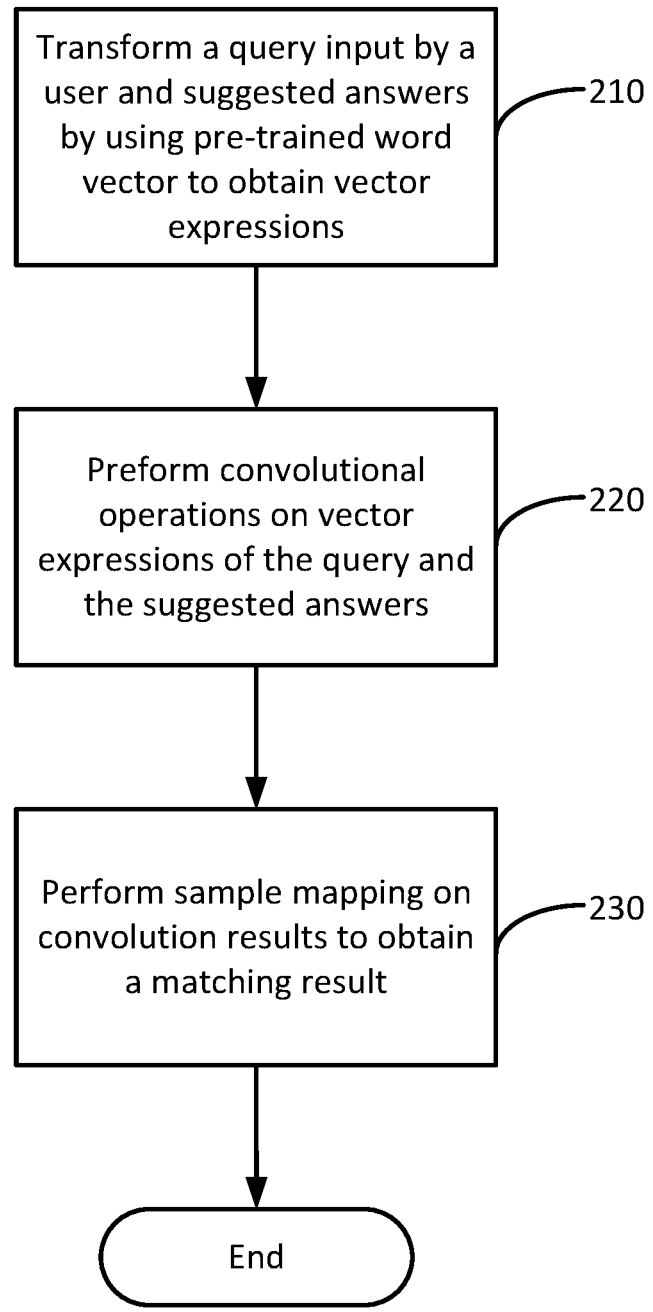
FIG. 2 is a schematic flow chart of a question answer matching method according to some embodiments of the specification.

FIG. 2 is a schematic flow chart of a question answer matching method according to some embodiments of the specification.

The question answer matching system and method according to some embodiments of the specification will be described below with reference to FIG. 1 and FIG. 2.

In the specification, a question answer matching system 100 comprises a convolutional neural network 110. As shown in the structural diagram of the convolutional neural network 110 in FIG. 1, first, a query inputted by a user and one of at least one suggested answer corresponding to the query are input into the convolutional neural network from two ends, respectively, and then are transformed in the first layer of the convolutional neural network (e.g., the word embedding layers), respectively, by using a pre-trained word vector to obtain vector representations of the query and the suggested answer. Subsequently, a convolutional neural network model is trained from end to end by using a positive sample and a negative sample in a pre-constructed dataset as training data in a subsequent layer of the convolutional neural network (e.g., a convolutional layer and a fully connected layer), thereby obtaining an answer matching the user query.

For example, as shown in FIG. 1, the question answer matching system 100 provided by the specification is used for providing a matching answer to a user query, wherein the system comprises the convolutional neural network 110, and the convolutional neural network 110 comprises:

a word embedding layer on a query side and an answer side, respectively, and configured to use a pre-trained word vector for expressing a basic feature in the respective layer to transform the query and one of at least one suggested answer corresponding to the query, respectively, to obtain vector representations of the query and the corresponding suggested answer;

a convolutional layer on the query side and the answer side, respectively, (e.g., the convolutional layer 1 and the convolutional layer 2 shown in FIG. 1) and configured to perform a convolutional operation on the vector representations of the query and the suggested answer so as to extract features; and a fully connected layer, wherein convolutional results from the query side and the answer side after convolution by the convolutional layers are all input into the fully connected layer, and a matching result is output from the fully connected layer.

Here, the word embedding layer on the query side shares the pre-trained word vector with the word embedding layer on the answer side, while the two convolutional layers at the query side and the answer side do not share weight parameters and bias parameters.

In some embodiments, although one fully connected layer is shown in FIG. 1, the convolutional neural network of the question answer matching system in the specification may include one or more fully connected layers, which is not limited by the specification.

Here, the at least one suggested answer corresponding to the user query may be selected, for example, from encyclopedia data (e.g., Wikipedia, Baidu Baike, and the like), or may be selected, for example, from a special database, which is not limited by the specification.

In some embodiments, the two word embedding layers of the convolutional neural network may share parameters, and the shared parameters may include the pre-trained word vector, e.g., the two word embedding layers may be the same. In some embodiments, the two convolutional layers may not share parameters (e.g., configuration parameters such as weight parameters and/or bias parameters), e.g., the two corresponding sides of query and answer use different convolutional layers to extract features. Namely, in these examples, the two convolutional layers are different (which are illustrated as the convolutional layer 1 and the convolutional layer 2 in FIG. 1, respectively). When different convolutional layers are used to extract features, as in some embodiments of the specification, query data and answer data may have significantly different distributions and forms. When different convolutional layers are used at the query side and the answer side to extract features, the obtained final answer may have higher degree of matching.

In addition, when the degree of matching between a query and one of multiple answers corresponding to the query is calculated, a classified (positive sample or negative sample)

loss function may be used to replace the conventionally used sorting loss function (the degree of matching is greater for positive samples than for negative samples), and the reason is that the conventionally used sorting loss function is more suitable for a searching scenario. For example, a user inputs a question, the system may provide a plurality of answers for the user to select, and the plurality of answers provided by the system may be provided according to relative degrees of matching. In the end, the user himself/herself chooses a relatively suitable one. In the case where the system directly provides a matching answer in the specification, however, it has to be the system that makes the choice. It is possible that there may be no answer that truly matches. In this case, the answer's own degree of matching may be considered, rather than the relative degree of matching compared with other answers (e.g., which one is more relevant and more matching compared with other answers). Therefore, the classified loss function is considered to be used in the specification to replace the conventionally used sorting loss function.

Correspondingly, the question answer matching method according to some embodiments of the specification as shown in FIG. 2 is used for providing a matching answer to a user query, wherein the method is based on the above convolutional neural network 110.

Here, in step 210, a query input by a user and one of at least one suggested answers corresponding to the query are transformed, respectively, by using a pre-trained word vector to obtain vector representations of the query and the corresponding suggested answer.

Then, in step 220, a convolutional operation is performed on the vector representations of the query and feature expression of the corresponding suggested answer, respectively, to extract features.

Subsequently, in step 230, convolution results of the vector representations of the query and the corresponding suggested answer are mapped into a sample annotating space to obtain a matching result of the query.

Here, when the operation to obtain vector representations for the query and the suggested answer corresponding to the query is executed in step 210, the pre-trained word vector is shared for use, while the convolutional operation on the query does not share a configuration parameter (e.g., a weight parameter and/or a bias parameter in convolutional operations) with the convolutional operation on the corresponding suggested answer in step S120.

Figure 3:
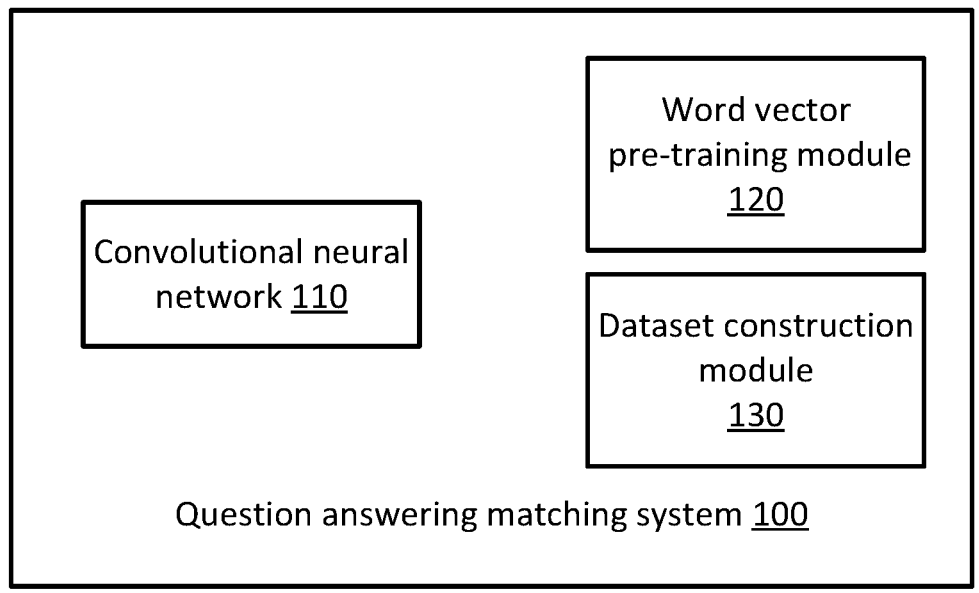
FIG. 3 is a schematic block diagram of a question answer matching system according to some embodiments of the specification.

FIG. 3 is a schematic block diagram of a question answer matching system according to some embodiments of the specification.

As shown in FIG. 3, in addition to the above convolutional neural network 110, the question answer matching system 100 may further comprise a word vector pre-training module 120 and a dataset constructing module 130.

For example, the word vector pre-training module 120 is configured to collect query data from users and encyclopedia data as corpuses, the query data comprising a plurality of queries, and train the pre-trained word vector based on the corpuses.

Figure 4:
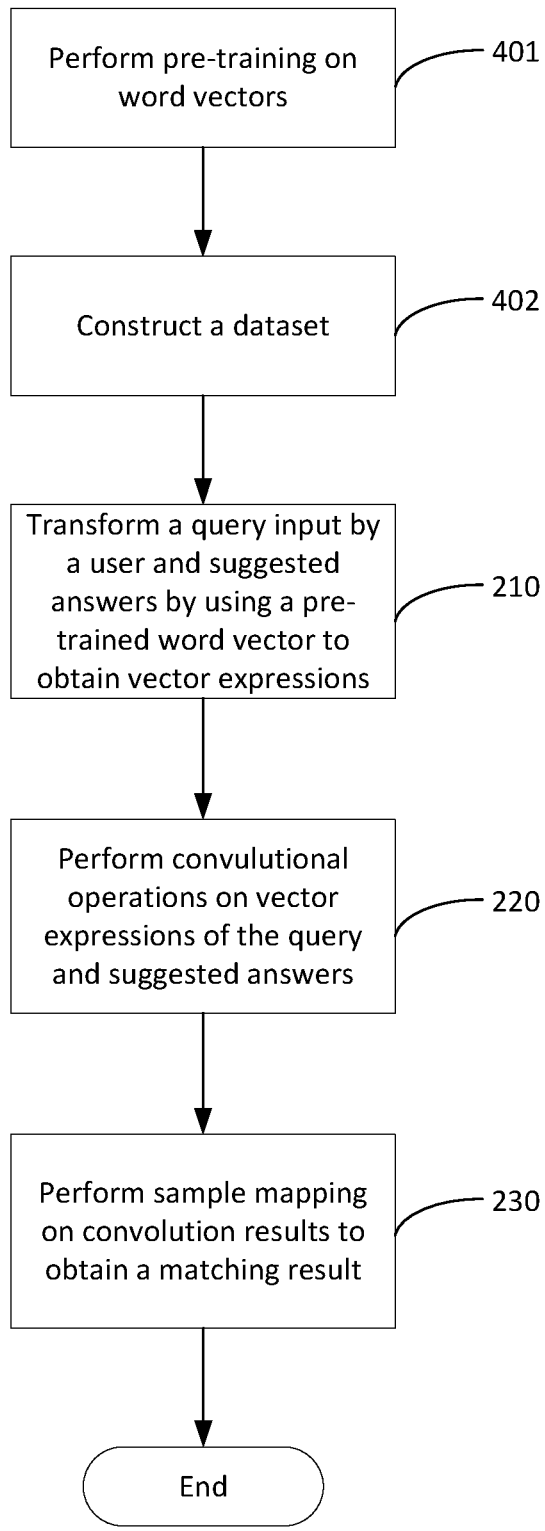
FIG. 4 is a schematic flow chart of a question answer matching method according to some embodiments of the specification.

FIG. 4 is a schematic flow chart of a question answer matching method according to some embodiments of the specification.

As shown in FIG. 4, in step 401, a process of pre-training word vectors is performed to obtain a pre-trained word vector with a strong generalization capability as a unified basic feature.

As described above, in conventional methods, basic features are often obtained from standard encyclopedia data (e.g., Wikipedia, Baidu Baike, and the like) based on artificial rules and features, which leads to the problems described in the Background section, such as inconsistent capabilities of expressing different features, insufficient generalization capabilities for mass data, the overall effect of the model being limited by the accuracy of a model for feature extraction at an earlier stage, and the like. Therefore, the method here is intended to obtain a word vector with a strong generalization capability as a unified basic feature.

The embodiments of the specification take into account that standard encyclopedia data has low degree of matching with colloquial questions often posed by users in practical operations, as the standard encyclopedia data is often formal and standardized. Therefore, the embodiments adopt the following method: collecting user inputs (e.g., queries from users) before training the word vector, so that the collected colloquial query data is used as a corpus source for training the word vector.

In some embodiments, the above-described query data or corpus input by users may be character strings input by the users or speech data input by the users, or may even be a mixture of texts and speech, e.g., the specification supports a variety of query data or corpus, such as speech, text, and a combination of speech and text.

For example, a piece of speech-type query data may be first converted to text data, during which certain precision processing may be performed on the text data obtained from the conversion, thereby converting a speech query to a text query.

Furthermore, for a piece of query data with mixed text and speech, the above processing is performed first on the speech data thereof, and then the text data obtained from the speech processing is combined with the text data in the query to obtain the final query text data.

Alternatively, other operations and processing may be performed on the speech data to obtain corresponding textualized data.

In some embodiments, query data or the corresponding corpus may be directly collected from user inputs or from a system's log (e.g., the log file of Shenma Search), or in another suitable manner.

In some embodiments, when user queries are collected, recent data may be collected, such as data from the most recent 60 days, and then low-frequency queries are filtered out according to the corresponding number of querying times. The low-frequency queries that are filtered out are often, for example, queries that are not complete questions, illegal or incompliant queries, unrecognizable queries, and the like. Accordingly, the query data is simplified so as to improve the processing speed and efficiency, and meanwhile, improve the generalization capability of word vectors. In other words, queries with more extensive applications are selected as much as possible to construct and train a word vector as a unified vector representation basis.

Subsequently, public encyclopedia data (e.g., Wikipedia data, Baidu Baike data, and the like) may be downloaded for pre-processing (e.g., conversion from traditional version to simplified version and the like). Then, these two pieces of data, e.g., the query data from the user input and the query data from the download, are combined, to obtain the word vectors by training based on a word vector embedding method (e.g., the Swivel algorithm).

A person having ordinary skill in the art understands that query data or corpus has an uneven pattern distribution with some queries or words having high frequencies of occurrence and others having low frequencies of occurrence. According to experimental tests, it can be seen that word vectors trained with the Swivel algorithm have strong generalization capabilities and better effects compared to others. The effect is particularly good for word vectors of low-frequency words in the corpus.

In this step, in addition to considering the co-occurrence relationship between words in local context as what conventional methods do, information like word frequency is also considered from a global perspective. For example, in this step, the specification not only proposes direct use of user inputs as the query data or one of the corpuses for training word vectors, but also further considers the applicability, standardization, and popularity of the query data or corpus, thereby achieving strong generalization capabilities for the word vectors obtained from training.

In addition, the question answer matching system according to the specification may use a positive sample and a negative sample in a pre-constructed dataset as training data to train a convolutional neural network model from end to end, thereby obtaining an answer matching the user query.

For example, the question answer matching system 100 according to some embodiments of the specification further comprises a dataset constructing module 130. The dataset constructing module 130 is configured to obtain a query and a best answer corresponding to the query from existing question answering data and form positive sample, use randomly sampled answers not corresponding to the query in the question answering data as negative samples, and further use answers sampled from the question answering data and having literal similarities to the query as negative samples, thereby constructing a dataset corresponding the query and applying the constructed dataset to the convolutional neural network.

In addition, as shown in FIG. 4, the dataset constructing operation is performed in step 402.

For example, a query and answers corresponding the query (for example, questions on Baidu Knows, Zhihu, and the like and the corresponding answers) are captured from existing question answering data (such as the question answering webpage library of Shenma Search), and these answers are screened to keep the query and some suggested answers (at least one) from the corresponding answers thereof. For example, the screening method may be that the question and short answers with a length shorter than 50 characters corresponding to this question are kept. The specification does not limit the manner of screening question answering data. Subsequently, the query and a best answer corresponding to the query are formed into a pair as a positive sample, randomly sampled one or more answers from answers not answering the query are used as negative samples, and lastly, one or more answers having literal similarities to the query are sampled as negative samples.

In this step, the focus is on the construction of negative samples, because models trained only with randomly sampled negative samples do not yield good results. As a result, this solution adopts a manner in which incorrect answers similar in text to the question are used as negative samples to guide a model to capture correspondence relationship, rather than literal similarity in text, between questions and answers, thereby improving the accuracy of sample training.

In some embodiments, in order to improve the efficiency of data sampling, the method may perform semantic hashing on query text and answer text, and then sample incorrect answers similar to the query as negative samples on the basis of hash coding to construct a dataset corresponding to user queries.

The significant technical effects of the specification are shown by the following experimental data:

1) When the negative samples of the specification are not used to train a model, the positive reverse ratio on the test set is 1.7; after the negative samples of the specification are used to train a model, the positive reverse ratio is improved to around 1.8;

2) When the classified loss function is used to train a model, the positive reverse ratio on the test set is 1.94; on the other hand, when the conventional sorting loss function is used, the positive reverse ratio is correspondingly 1.83.

Actual examples are provided below. For example, the query input by a user is "how was the first bird in the world born."

The most matching three answers obtained through the question answer matching system and method according to the specification are:

1) But the theropod dinosaur origin hypothesis has been rejected by the international science community;

2) There are two hypotheses that are popular with the international science community: the hypothesis that birds are originated from theropod dinosaur and the hypothesis that birds have non-dinosaur origins;

3) Archaeopteryx both have features of birds and are similar in some respects to reptiles, and therefore, it is a strong piece of evidence that birds are evolved from reptiles.

With regard to this query, the most matching three answers obtained through the conventional model are:

1) Stupid birds . . . because stupid birds start to fly early;

2) But the theropod dinosaur origin hypothesis has been rejected by the international science community;

3) Birds are fully covered by feather, the body is streamlined, front limbs have become wings, rear limbs have become two feet to support the body weight, and all, except for a very small number of kinds, can fly.

From the above quantitative and qualitative experiments, it can be seen that the question answer matching system and method according to the specification yields more accurate answers than conventional methods do.

Figure 5:
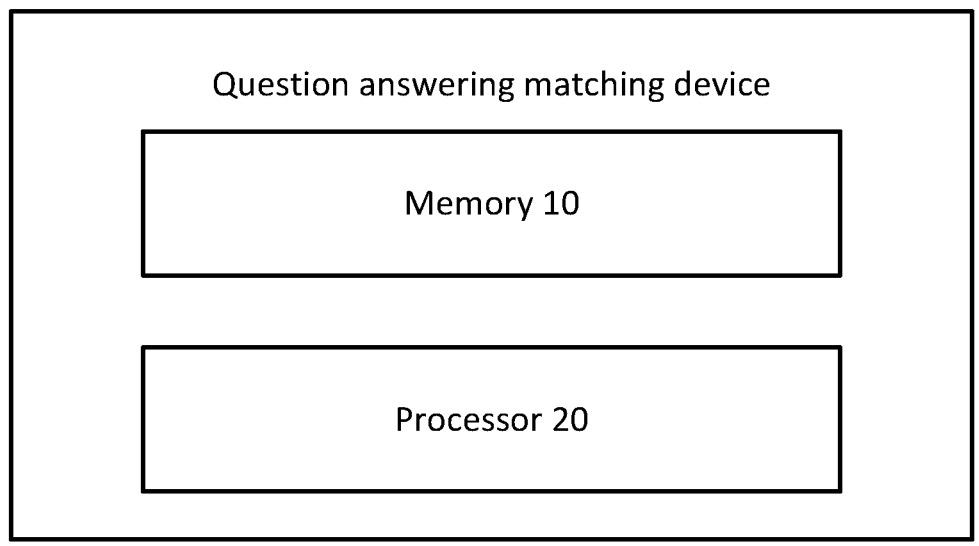
FIG. 5 is a block diagram of a question answering processing device according to some embodiments of the specification.

FIG. 5 is a block diagram of a question answer matching device according to some embodiments of the specification.

Referring to FIG. 5, the question answer matching device comprises a memory 10 and a processor 20.

The processor 20 may be a multi-core processor or may comprise a plurality of processors. In some embodiments, the processor 20 may comprise a general primary processor and one or more special co-processors, such as a graphics processing unit (GPU), a digital signal processor (DSP), and the like. In some embodiments, the processor 20 may be implemented with a customized circuit, such as an Application Specific Integrated Circuit (ASIC) or a Field Programmable Gate Arrays (FPGA).

The memory 10 may comprise a variety of storage units, such as a system memory, a Read-Only Memory (ROM), and a permanent storage device, wherein the ROM may store stationary data or instructions required by the processor 20 or other modules of a computer. The permanent storage device may be a readable and writable storage device. The permanent storage device may be a non-volatile storage apparatus that will not lose stored instructions and data even when the power to the computer is cut off. In some embodiments, a large capacity storage apparatus (e.g., a magnetic or optic disk or a flash memory) is used as the permanent storage device. In some other embodiments, the permanent storage device may be a removable storage device (e.g., a floppy disk or an optical drive). The system memory may be a readable and writable storage device or a volatile readable and writable storage device, such as a Dynamic Random-Access Memory. The system memory may store some or all instructions and data required by the processor during running. In addition, the memory 10 may comprise any combination of computer readable storage media, including various semiconductor storage chips (DRAM, SRAM, SDRAM, flash memory, programmable Read-Only Memory), and magnetic disks and/or optic disks may also be used. In some embodiments, the memory 10 may comprise readable and/or writable removable storage devices, such as Compact Discs (CD), Read-Only Digital Versatile Disc (e.g., DVD-ROM, dual-layer DVD-ROM), Read-Only Blu-ray Disc, Ultra Density Optical, flash memory card (e.g., SD card, min SD card, Micro-SD card, and the like), magnetic floppy disks, and the like. The computer readable storage media do not include carriers or transient electronic signals transmitted in a wireless or wired manner.

The memory 10 may store executable codes, and when executed by the processor 20, the executable codes cause the processor 20 to implement the above-described method.

In addition, the method according to the specification may also be embodied as a computer program or computer program product. The computer program or computer program product include computer program codes and instructions for executing the above-described steps defined in the above-described method according to the specification.

Alternatively, the specification may also be embodied as a non-transitory machine-readable storage medium (or a computer-readable storage medium or a machine-readable storage medium), wherein the machine-readable storage medium stores executable codes (or computer programs or computer instructions). When the executable codes are executed by a processor of an electronic device (or a computing device, server, etc.), the executable codes cause the processor to implement steps of the above method according to the specification.

Various logic blocks, modules, circuits, and algorithm steps described with reference to the disclosure herein may be implemented as electronic hardware, computer software, or a combination thereof.

Flow charts, block diagrams, and the like in the accompanying drawings illustrate system architectures, functions, and operations that may be implemented by the system and method according to a plurality of embodiments of the specification. Each block in the flow charts and block diagrams may represent a module, a program segment, or a part of code, and the module, program segment, or part of code comprises one or more executable instructions for achieving prescribed logic functions. In some embodiments, functions marked in blocks may also occur in an order different from what is marked in the accompanying drawings. For example, two consecutive blocks may actually be executed substantially in parallel, or may be executed in a reverse order, which depends on involved functions. Each block in the block diagrams and/or flow charts and a combination of blocks in the block diagrams and/or flow charts may be implemented by a dedicated hardware-based system for executing prescribed functions or operations or may be implemented by a combination of dedicated hardware and computer instructions.

The above embodiments are exemplary, not exhaustive. Without departing from the scope and spirit of the described embodiments, many modifications and variations are obvious to those of ordinary skills in the art. The selection of terms herein is intended to best describe the principle, practical applications, or improvements to technologies on the market of the embodiments, or to enable others of ordinary skills in the art to understand the embodiments disclosed herein.

What is claimed is:

1. A question answer matching method for providing a matching answer to a user query, the method being based on a convolutional neural network and comprising:
    obtaining, for a historical query, a positive sample comprising a best answer corresponding to the historical query, a negative sample comprising a randomly sampled answer not corresponding to the historical query, and another negative sample comprising an answer with literal similarities to the historical query, to construct a pre-constructed dataset corresponding to the historical query;
    training the convolutional neural network using the pre-constructed dataset as training data, wherein the convolutional neural network comprises one or more word embedding layers sharing a pre-trained word vector and one or more convolutional layers;
    transforming the user query and one of one or more suggested answers corresponding to the user query by using the pre-trained word vector to obtain vector representations of the user query and the one of one or more suggested answers corresponding to the user query;
    performing a convolutional operation through the one or more convolutional layers on the vector representations of the user query and the one of one or more suggested answers, respectively, to extract features; and
    mapping convolution results of the vector representations of the user query and the one of one or more suggested answers into a sample annotating space, to obtain a matching result of the user query.

2. The question answer matching method according to claim 1, wherein the method further comprises:
    collecting query data from users and encyclopedia data as corpuses, the query data comprising a plurality of queries; and
    training the pre-trained word vector based on the corpuses.

3. The question answer matching method according to claim 2, wherein the query data is filtered based on a number of iterations of each of the plurality of queries when the query data is collected.

4. The question answer matching method according to claim 1, wherein the convolutional operation on the vector representation of the user query does not share a configuration parameter with the convolutional operation on the vector representation of the one of one or more suggested answers.

5. The question answer matching method according to claim 1, wherein the convolutional neural network comprises a pair of word embedding layers sharing the pre-trained word vector, with a first word embedding layer corresponding to the user query, and a second word embedding layer corresponding to the one of one or more suggested answers corresponding to the user query.

6. The question answer matching method according to claim 1, wherein the convolutional neural network comprises a pair of convolutional layers, with a first convolutional layer corresponding to the user query, and a second convolutional layer corresponding to the one of one or more suggested answers corresponding to the user query.

7. The question answer matching method according to claim 6, wherein the convolutional neural network further comprises a fully connected layer receiving inputs from the pair of convolutional layers.

8. A question answer matching system for providing a matching answer to a user query based on a convolutional neural network, the system comprising one or more processors and one or more non-transitory computer-readable storage media storing instructions executable by the one or more processors to cause the system to perform operations comprising:
- obtaining, for a historical query, a positive sample comprising a best answer corresponding to the historical query, a negative sample comprising a randomly sampled answer not corresponding to the historical query, and another negative sample comprising an answer with literal similarities to the historical query, to construct a pre-constructed dataset corresponding to the historical query;
- training the convolutional neural network using the pre-constructed dataset as training data, wherein the convolutional neural network comprises one or more word embedding layers sharing a pre-trained word vector and one or more convolutional layers;
- transforming the user query and one of one or more suggested answers corresponding to the user query by using the pre-trained word vector to obtain vector representations of the user query and the one of one or more suggested answers corresponding to the user query;
- performing a convolutional operation through the one or more convolutional layers on the vector representations of the user query and the one of one or more suggested answers, respectively, to extract features; and
- mapping convolution results of the vector representations of the user query and the one of one or more suggested answers into a sample annotating space, to obtain a matching result of the user query
- wherein the convolutional operation on the vector representation of the user query does not share a configuration parameter with the convolutional operation on the vector representation of the one or more suggested answers.

9. The question answer matching system according to claim 8, wherein the operations further comprise:
- collecting query data from users and encyclopedia data as corpuses, the query data comprising a plurality of queries; and
- training the pre-trained word vector based on the corpuses.

10. The question answer matching system according to claim 9, wherein the query data is filtered based on a number of iterations of each of the plurality of queries when the query data is collected.

11. The question answer matching system according to claim 8, wherein the convolutional neural network comprises a pair of word embedding layers sharing the pre-trained word vector, with a first word embedding layer corresponding to the user query, and a second word embedding layer corresponding to the one of one or more suggested answers corresponding to the user query.

12. The question answer matching system according to claim 8, wherein the convolutional neural network comprises a pair of convolutional layers, with a first convolutional layer corresponding to the user query, and a second convolutional layer corresponding to the one of one or more suggested answers corresponding to the user query.

13. The question answer matching system according to claim 12, wherein the convolutional neural network further comprises a fully connected layer receiving inputs from the pair of convolutional layers.

14. A non-transitory computer-readable storage medium for providing a matching answer to a user query based on a convolutional neural network, configured with instructions executable by one or more processors to cause the one or more processors to perform operations comprising:
- obtaining, for a historical query, a positive sample comprising a best answer corresponding to the historical query, a negative sample comprising a randomly sampled answer not corresponding to the historical query, and another negative sample comprising an answer with literal similarities to the historical query, to construct a pre-constructed dataset corresponding to the historical query;
- training the convolutional neural network using the pre-constructed dataset as training data, wherein the convolutional neural network comprises one or more word embedding layers sharing a pre-trained word vector and one or more convolutional layers;
- transforming the user query and one of one or more suggested answers corresponding to the user query by using the pre-trained word vector to obtain vector representations of the user query and the one of one or more suggested answers corresponding to the user query;
- performing a convolutional operation through the one or more convolutional layers on the vector representations of the user query and the one of one or more suggested answers, respectively, to extract features; and
- mapping convolution results of the vector representations of the user query and the one of one or more suggested answers into a sample annotating space, to obtain a matching result of the user query;
- wherein the convolutional neural network comprises a first word embedding layer corresponding to the user query, and a second word embedding layer corresponding to the one of one or more suggested answers corresponding to the user query.

15. The non-transitory computer-readable storage medium according to claim 14, wherein the operation further comprise:
- collecting query data from users and encyclopedia data as corpuses, the query data comprising a plurality of queries; and
- training the pre-trained word vector based on the corpuses.

16. The non-transitory computer-readable storage medium according the claim 15, wherein the query data is filtered based on a number of iterations of each of the plurality of queries when the query data is collected.

17. The non-transitory computer-readable storage medium of claim 14, wherein the convolutional operation on the vector representation of the user query does not share a configuration parameter with the convolutional operation on the vector representation of the one of one or more suggested answers.

18. The non-transitory computer-readable storage medium of claim 14, wherein the convolutional neural network comprises a pair of convolutional layers, with a first convolutional layer corresponding to the user query, and a second convolutional layer corresponding to the one of one or more suggested answers corresponding to the user query.

19. The non-transitory computer-readable storage medium of claim 18, wherein the convolutional neural network further comprises a fully connected layer receiving inputs from the pair of convolutional layers.

* * * * *